(12) United States Patent
Rakshit et al.

(10) Patent No.: US 10,607,383 B2
(45) Date of Patent: Mar. 31, 2020

(54) SEAMLESS FOCUS PLANE STITCHING TO CREATE PANORAMIC VIDEO

(71) Applicant: International Business Machines Corporation, Armonk, NY (US)

(72) Inventors: Sarbajit K. Rakshit, Kolkata (IN); Shilpa Sadananda Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/592,673

(22) Filed: May 11, 2017

(65) Prior Publication Data

US 2018/0330188 A1     Nov. 15, 2018

(51) Int. Cl.
| | |
|---|---|
| *G06K 9/62* | (2006.01) |
| *G06T 1/00* | (2006.01) |
| *G06K 9/00* | (2006.01) |
| *G06T 11/60* | (2006.01) |
| *H04N 19/00* | (2014.01) |
| *H04N 5/232* | (2006.01) |
| *G06K 9/20* | (2006.01) |

(52) U.S. Cl.
CPC ......... *G06T 11/60* (2013.01); *H04N 5/23238* (2013.01); *H04N 19/00* (2013.01); *G06K 9/00718* (2013.01); *G06K 2009/2045* (2013.01)

(58) Field of Classification Search
CPC .... G06T 11/60; H04N 5/23238; H04N 19/00; G06K 2009/2045; G06K 9/00718
See application file for complete search history.

(56) References Cited

U.S. PATENT DOCUMENTS

| | | | | |
|---|---|---|---|---|
| 6,018,349 A | * | 1/2000 | Szeliski | G06T 3/0068 345/629 |
| 6,788,333 B1 | * | 9/2004 | Uyttendaele | H04N 5/23238 348/36 |
| 6,813,391 B1 | * | 11/2004 | Uyttendaele | G06K 9/03 345/629 |
| 7,483,590 B2 | * | 1/2009 | Nielsen | G06T 3/0062 382/285 |
| 8,106,936 B2 | * | 1/2012 | Strzempko | G06T 3/4038 348/36 |

(Continued)

OTHER PUBLICATIONS

Chen, Bing-Yu, et al. "Capturing Intention-based Full-Frame Video Stabilization." Computer Graphics Forum. vol. 27. No. 7. Oxford, UK: Blackwell Publishing Ltd, 2008. (Year: 2008).*

(Continued)

*Primary Examiner* — Bobbak Safaipour
(74) *Attorney, Agent, or Firm* — Christopher M. Pignato (57) ABSTRACT

A system for forming panoramic video that includes a server programmed to gather a plurality of videos of a predetermined event. The server is also programmed to extract metadata from the plurality of videos and determine the focus plane of each of the plurality of videos. The server is further programmed to plot a possible panoramic video path across some or all of the plurality of videos using the focus planes of the plurality of videos and at least two locations selected by a user. The server is programmed to then stitch some or all of the plurality of videos together to form a panoramic video based on the video path.

17 Claims, 7 Drawing Sheets

(56) References Cited

U.S. PATENT DOCUMENTS

| | | | | |
|---|---|---|---|---|
| 8,223,208 | B2* | 7/2012 | Alexander | G06K 9/209 348/187 |
| 2006/0204128 | A1* | 9/2006 | Silverstein | G06T 5/008 382/275 |
| 2015/0287246 | A1 | 10/2015 | Huston et al. | |
| 2018/0205884 | A1* | 7/2018 | Hornung | H04N 5/23238 |
| 2018/0205934 | A1* | 7/2018 | Abbas | H04N 19/40 |
| 2019/0045119 | A1* | 2/2019 | Stokking | G06K 9/00758 |

OTHER PUBLICATIONS

Seon Ho Kim, Ying Lu, Junyuan Shi, Abdullah Alfarrarjeh, Cyrus Shahabi, Guanfeng Want, and Roger Zimmermann, Key Frame Selection Algorithms for Automatic Generation of Panoramic Images from Crowdsourced Geo-tagged Videos, Web and Wireless Geographical Information Systems, vol. 8470 of the series Lecture Notes in Computer Science, Springer.com 2014, pp. 67-84.

Feng Liu, Yu-Hen Hu, and Michael L. Gleicher, Discovering Panoramas in Web Videos, MM'08 Proceedings of the 16th ACM international conference on Multimedia, ACM.org Vancouver, British Columbia, Canada, Copyright 2008, pp. 329-338.

360 Video Stitching Software and Workflow Overview; http://freedom360.us/tutorials/software/software-info/; printed Jun. 22, 2016; 6 pages.

Panocam3D—Stitching Softwares & 3D 360 video players; http://www.panocam3d.com/software.html; printed Jun. 22, 2016; 1 page.

360 video made easy | VideoStitch—VR Video solutions, Live VR with Vahana VR; http://www.video-stitch.com/; printed Jun. 22, 2016, 4 pages.

KurzweilAI | accelerating Intelligence.News, How to create a seamless panorama video from multiple cameras, dated May 5, 2015, http://www.kurzweilai.net/how-to-create-a-seamless-panorama-video-from-multiple-cameras; printed Mar. 8, 2017, 3 pages.

Norman Chan, Adam Savage's Tested, Creating Time-Lapse Videos from Crowd-Sourced Photos, dated May 18, 2015, http://www.tested.com/tech/528640-creating-time-lapse-videos-crowd-sourced-photos/, printed Mar. 8, 2017, 4 pages.

http://www.wired.co.uk/news/archive/2014-05/09/mapillary (link no longer available).

Abstract: FlyCam: practical panoramic video and automatic camera control—IEEE Xplore Document, http://ieeexplore.ieee.org/xpl/login.jsp?tp=&arnumber=871033&url=http%3A%2F%2Fieeexplore.ieee.org%2Fxpls%2Fabs_all.jsp%3Farnumber%3D871033, printed Mar. 9, 2017, 3 pages.

Matthew Brown and David G. Lowe, Automatic Panoramic Image Stitching using Invariant Features, Department of Computer Science, University of British Columbia, Vancouver, Canada, http://matthewalunbrown.com/papers/ijcv2007.pdf, 16 pages.

Kolor | How to create panoramas, http://www.kolor.com/panoramas/#start, printed Mar. 8, 2017, 5 pages.

* cited by examiner

FIG. 7

SEAMLESS FOCUS PLANE STITCHING TO CREATE PANORAMIC VIDEO

BACKGROUND

The present invention relates to panoramic video and, more specifically, to a system and method for seamless focus plane stitching for the creation of panoramic video.

During an event, multiple viewers may capture videos from different directions and perspectives. While capturing video, viewers may also change the focus plane by changing the zoom level of the video recording device. As a result, the video capture point and focus plane among captured video may be same or can have different zoom levels, directions, and angles of capture. Because of these differences, the creation of a panoramic video from the multiple videos, which may be obtained by crowdsourcing, is extremely difficult due to the lack of a seamless focus plane path. Accordingly, there is a need in the art for an approach of creating a panoramic video that identifies the best possible seamless focus plane from multiple videos so that they can be stitched together to form a panoramic video.

SUMMARY

One embodiment of the invention is a system for forming panoramic video that identifies the best focus planes from multiple videos so that they can be stitched together to form a seamless panoramic video. The system has a server programmed to gather a plurality of videos of a predetermined event, to extract metadata from the plurality of videos, determine a focus plane for each of the plurality of videos, to plot a possible panoramic video path across some or all of the plurality of videos using the focus plane of each of the plurality of videos and at least two locations selected by a user, and to stitch some or all of the plurality of videos together to form a panoramic video. The server is programmed to plot a possible panoramic video path by identifying a series of candidate videos based upon the least square method. The metadata comprises the direction of capture, the field of view, the angular orientation, and the zoom level. The server is programmed to stitch some or all of the plurality of videos together to form a panoramic video by stitching together a series of frames from adjacent videos. The server may also be programmed to determine whether any discontinuities between adjacent focus planes of the plurality of videos are within a threshold. The server may also be programmed to predict intermediate focus planes to address any discontinuity between adjacent focus planes of the plurality of videos when the discontinuity is within the threshold. The server is programmed to select a different panoramic video path if the discontinuity between adjacent focus planes of the plurality of videos is above the threshold.

Another embodiment of the invention is a method of forming panoramic video, comprising the steps of gathering a plurality of videos of a predetermined event, extracting metadata from the plurality of videos, determining a focus plane for each of the plurality of video, plotting a possible panoramic video path across some or all of the plurality of videos using the focus plane of each of the plurality of videos and at least two locations selected by a user, and stitching some or all of the plurality of videos together to form a panoramic video. The step of plotting a possible panoramic video path comprises identifying a series of candidate videos based upon the least square method. The step of extracting metadata from the plurality of videos comprises determining the direction of capture, the field of view, the angular orientation, and the zoom level. The step of stitching some or all of the plurality of videos together to form a panoramic video comprises stitching together a series of frames from adjacent videos. The step of stitching some or all of the plurality of videos together may also include the step of determining whether any discontinuities between adjacent focus planes of the plurality of videos are within a threshold. The step of stitching some or all of the plurality of videos together may further include the step of predicting intermediate focus planes to address any discontinuities between adjacent focus planes of the plurality of videos when the discontinuities are within the threshold. The step of stitching some or all of the plurality of videos together may also include the step of selecting a different panoramic video path if the discontinuities between adjacent focus planes of the plurality of videos are above the threshold.

A further embodiment of the invention is a computer program product for forming panoramic video, the computer program product comprising a computer readable storage medium having program instructions embodied therewith, the program instructions executable by a computing device to cause the computing device to perform a method of forming panoramic video comprising the steps of gathering a plurality of videos of a predetermined event, extracting metadata from the plurality of videos, determining a focus plane for each of the plurality of video, plotting a possible panoramic video path across some or all of the plurality of videos using the focus plane of each of the plurality of videos and at least two locations selected by a user, and stitching some or all of the plurality of videos together to form a panoramic video. The step of plotting a possible panoramic video path comprises identifying a series of candidate videos based upon the least square method. The step of extracting metadata from the plurality of videos comprises determining the direction of capture, the field of view, the angular orientation, and the zoom level. The step of stitching some or all of the plurality of videos together to form a panoramic video comprises stitching together a series of frames from adjacent videos. The program instructions executable by the computing device may also cause the computing device to perform the step of stitching some or all of the plurality of videos together may also include the step of determining whether any discontinuities between adjacent focus planes of the plurality of videos are within a threshold. The program instructions executable by the computing device may also cause the computing device to perform the step of predicting intermediate focus planes to address any discontinuities between adjacent focus planes of the plurality of videos when the discontinuities are within the threshold. The program instructions executable by the computing device may also cause the computing device to perform the step of selecting a different panoramic video path if the discontinuities between adjacent focus planes of the plurality of videos are above the threshold.

DETAILED DESCRIPTION

Figure 1:
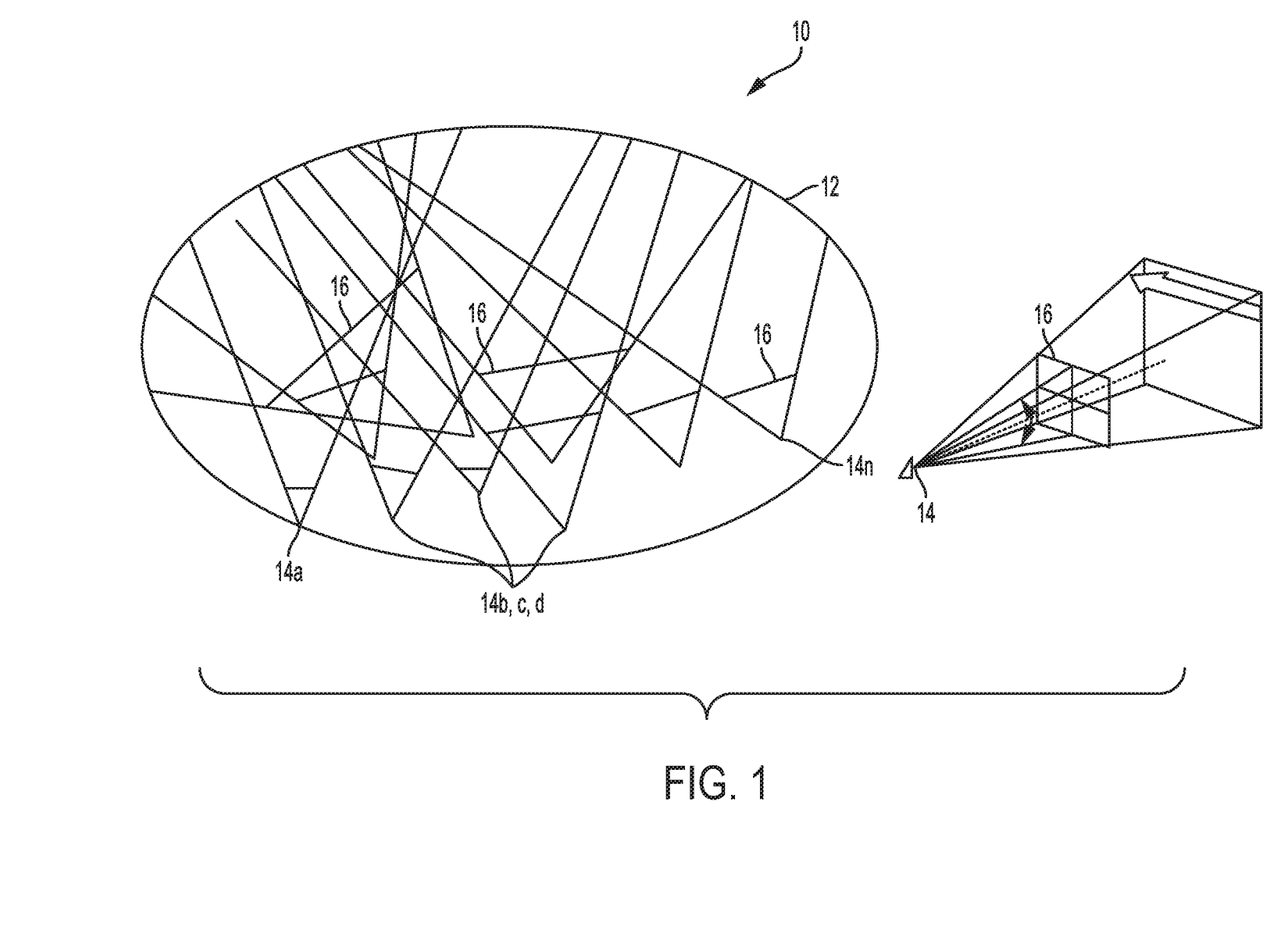
FIG. 1 is schematic of a system for seamless panoramic video stitching.

Referring to the figures, wherein like numerals refer to like parts throughout, there is seen in FIG. 1 a system 10 for forming a panoramic video from individual videos captured of a particular event in a given location 12, such as sports stadium, by different users. As seen in FIG. 1, individual videos may be captured a plurality of disparate video capture locations 14a through 14n. The video collection may be accomplished by programming system 10 to search and retrieve relevant video from the public domain, e.g., system 10 may search for and download videos of an event that are posted by attendees to the event to various social media websites. For example, system 10 can search video metadata, such as time, data, and geolocation, to locate videos captured from the same location and at over the same or overlapping time periods. System 10 can also search videos using contend based approaches to identify relevant videos, or to confirm that videos found by metadata searching are correct.

Each video captured from each video capture location 14 includes a focus plane 16 defining the capture area of the content of the video. Video capture location 14 is not same as a capture focus plane 16 because a user may use the zoom feature of the video camera such that capture focus plane 16 is not co-located with video capture location 14. As a result, system 10 is programmed to identify and collect all possible videos that are available of an event and then identify focus plane 16 of each. For example, system 10 can extract metadata from each video to determine the location and orientation of the focus plane, such as the direction of capture, the field of view, the angular orientation, and the zoom level, for each frame of the video (as a user may change zoom and orientation, or the subject may move, focus plane 16 can move during the elapsed time of the video). For example, from the extracted information, system 10 can determine the precise dimension, position, and orientation of focus plane 16 for each frame of each video taken at locations 14a through 14n of any given timeframe. This may be calculated based on selected focal length of camera. For example, it is possible to determine from where the frame has been started, for 12 mm focal length, the target object is very small, because the frame has been started long before, but for focal length 200 mm, the target object is very clear. The zoom level will tell from where the frame has been started, called the frame location. Angular orientation represents at which direction the photograph is being captured.

Figure 2:
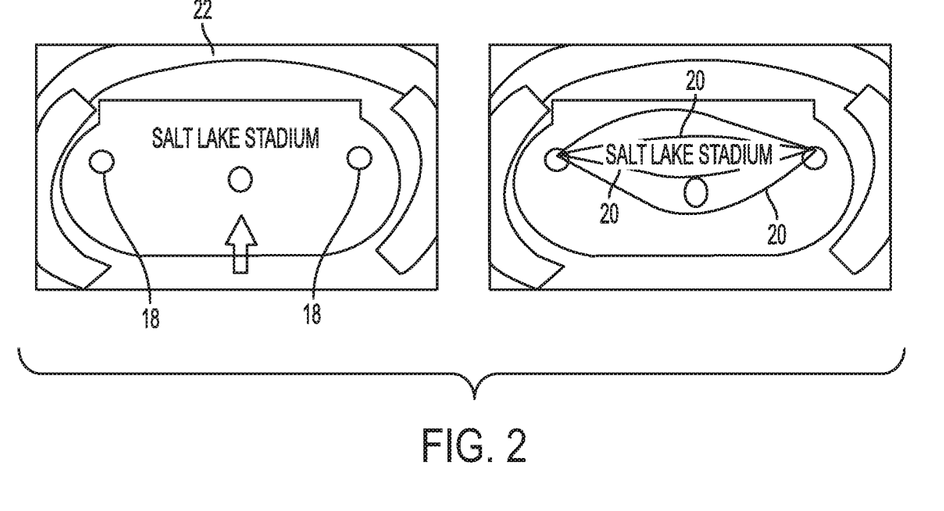
FIG. 2 is a schematic of a user input screen for a system for seamless panoramic video stitching.

Referring to FIG. 2, system 10 is further configured to allow a user to select at least two of the perspective points 18 that define a path 20 of videos from which the panoramic video will be formed. A user can be presented with a map 22 of the location or venue upon which the two points or more may be indicated. It should be recognized that the selection of three or more points will limit the number of possible paths along which a panoramic video may be formed.

Figure 3:
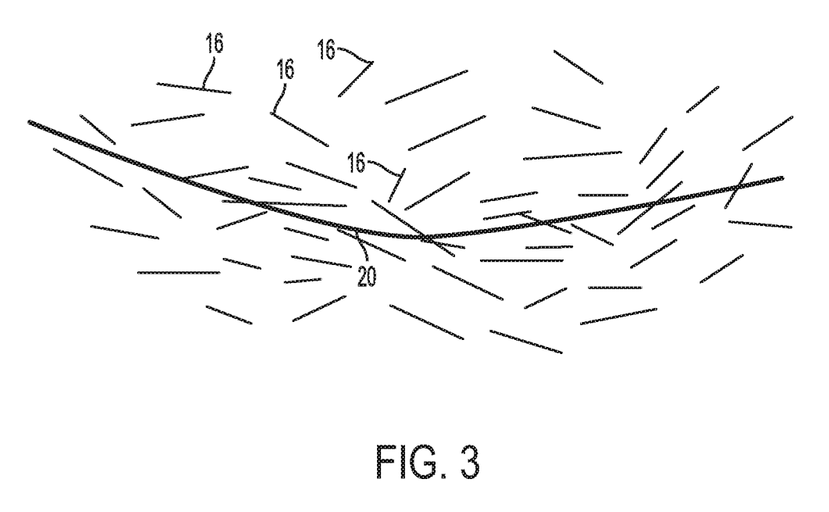
FIG. 3 is a schematic of a panoramic image path for identifying focus planes to be stitched by a system for seamless panoramic video stitching.
Figure 4:
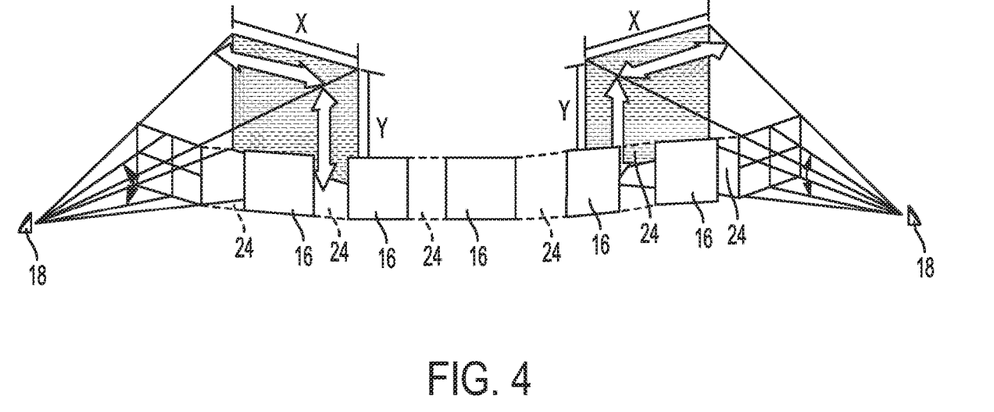
FIG. 4 is a schematic of a panoramic image path of focus planes identified for stitching by a system for seamless panoramic video stitching.

Referring to FIG. 3, once points 18 have been selected, system 10 determines the possible paths 20 along the focus frames 16. In other words, system determines the curved line that joins adjacent focus planes as a candidate video stitching path 18. In the event of any gaps 24 between any pair of adjacent frames in the curve line, as seen in FIG. 4, system 10 can predict the contend of the missing intermediate video frame if the gap between any two frames are within a threshold, or can select a new path 20 if the gap is above the threshold. Prediction approaches are known to those of skill in the art. For example, software and algorithms that perform intra prediction reconstruction of images are available in the art. Similarly, deep-learning algorithm that predict photo memorability at "near-human" levels using algorithm can create heat map identifying the most memorable and forgettable regions and then adjust images based on the heat map. Once any gaps are filled, if necessary, the frames may then be stitched together using convention stitching processes.

Figure 5:
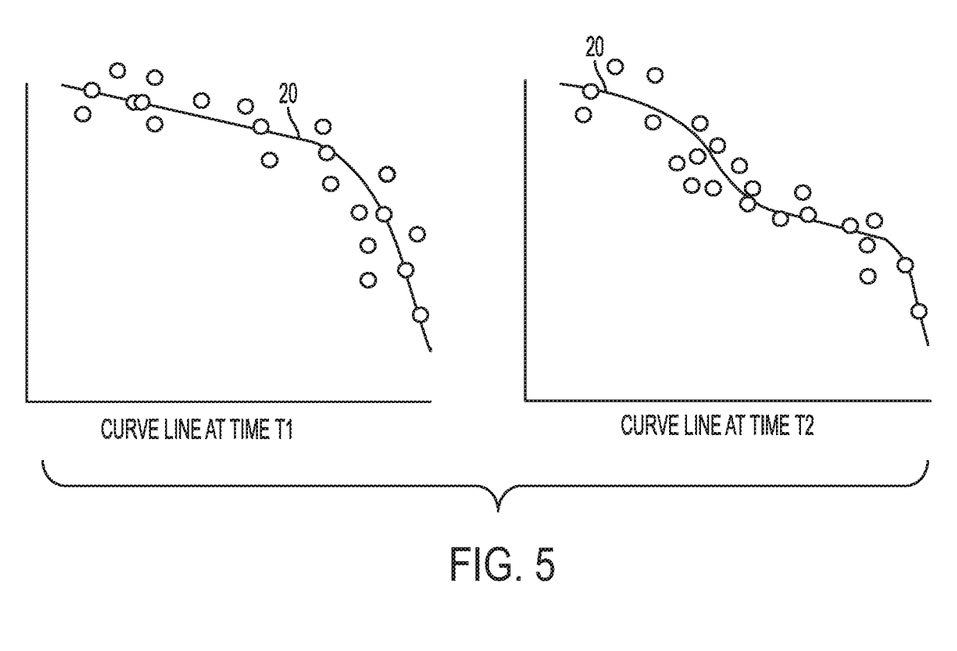
FIG. 5 is a series of graphs of a least square method for identifying focus planes for panoramic stitching.

Referring to FIG. 5, system 10 is programmed to use the least square method to determine the best fit and thus an appropriate curve path 18. Each point considered by the least square method is focus plane 16 from the collected video content. Multiple video content focus planes 16 may be found and considered, if available. Additionally, as explained above, when a user controls the camera parameters (such as direction, zoom, angle etc.) over time, focus plane 16 may change. As a result, system 10 can dynamically maintain a lesser deviation of the curve to identify the final path 20 that will be used to create the panoramic video.

Figure 6:
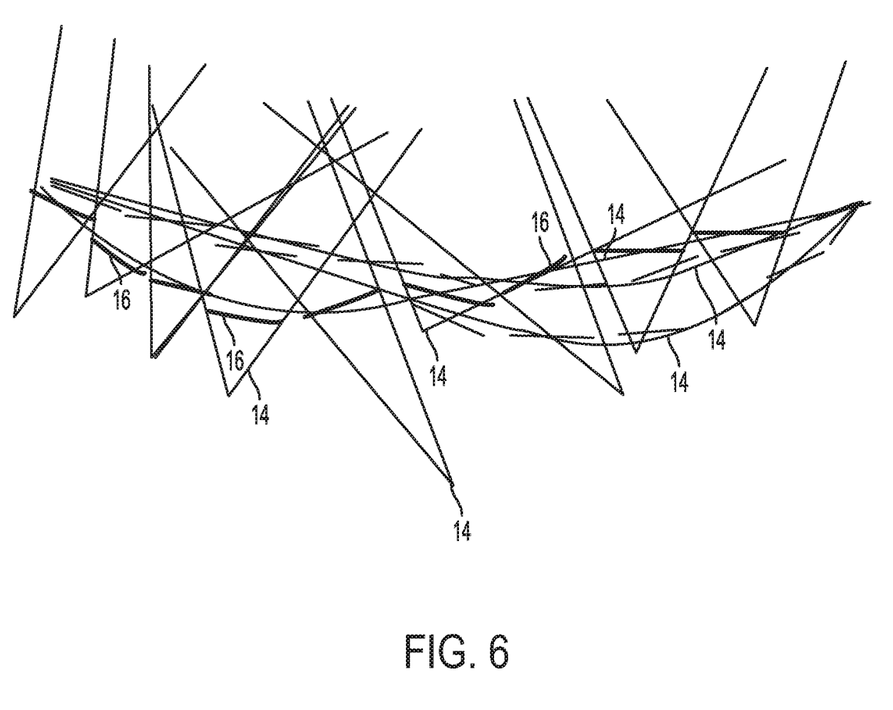
FIG. 6 is a schematic of alternative stitching paths identified by a system for seamless panoramic video stitching.

Referring to FIG. 6, the focus planes of multiple videos may result in several potential stitching paths using the least square method. For example, system 10 can extract the size and rotation invariant feature points of each frame and then apply the least squares method to identify frames that have size and rotation invariant feature points that are most closely related. The least square method involves finding a line of best fit through the point and begins with a calculation of the mean of the x-values and the mean of the y-values. The slope of the line of best fit is then determined from the means and the y-intercept of the line is calculated. Finally, using the y-intercept and the slope, the equation of the line can be determined. The formula for calculating each of these steps is well known to those of skill in the art.

Once potential stitching path is identified or selected, system 10 can create a series of panoramic videos by stitching the individual frames along each path over a user selected time period. Video stitching may be performed using conventional approaches for assembling multiple videos into a single video. For example, individual frames may be aligned by first finding an incremental deformation of one frame relative to a three-dimensional coordinate system to reduce registration error between overlapping portions of the pair of images. One frame may then be warped in accordance with the incremental deformation found by computing a difference error vector between the pair of frames where the one image is divided into plural patches, and then, within each patch, gradients are computed at pixels within the patch and a single Jacobian is computed for the entire patch. The single Jacobian is the Jacobian of a coordinate system of the one frame with respect to the incremental deformation. The gradients may then be combined with the Jacobian to produce a matrix for the patch. The gradients are separately combined with the error vector and with the Jacobian to produce a residual for the patch. The matrix is summed over plural patches and the residual is also summed over plural patches to produce Hessians and residuals, respectively. Normal equations are defined with the residuals and Hessians and are solved to provide the desired incremental deformation. In another approach, features or interest points may be extracted from every new image frame, with a first image frame being identified as a starting point. Each subsequent frame is then matched using the features to an adjacent frame, with the process repeated for the next adjacent frame. Thus, each frame is matched to the next frame and combined therewith to construct a frame mosaic from the sequence of stitched image frames.

Figure 7:
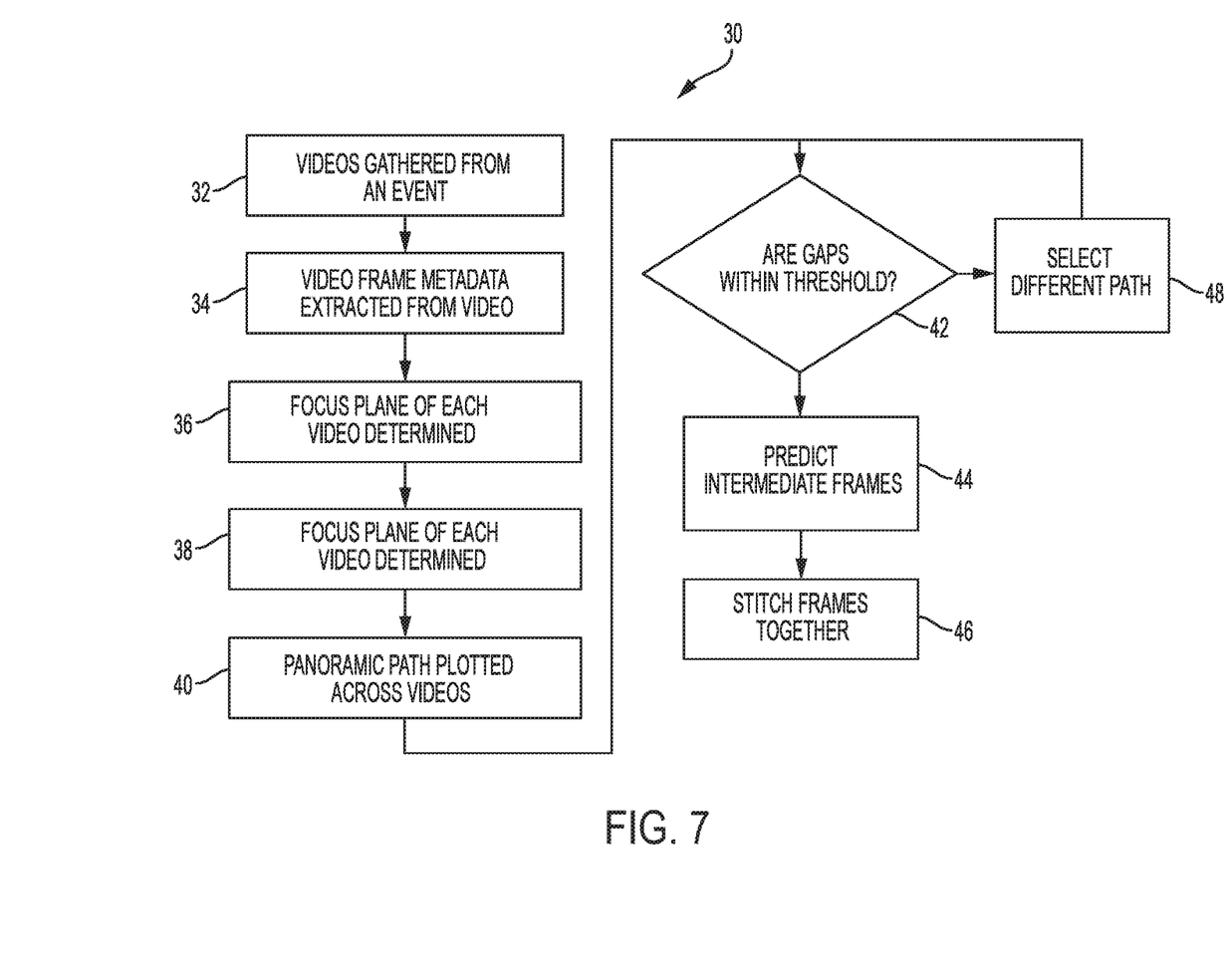
FIG. 7 is a flowchart of a method of seamless panoramic video stitching.

A method 30 of forming panoramic video begins with the gathering of multiple videos of an event 32, such as those posted in the public domain. System 10 next extracts video metadata from the video 34 to allow determination of the focus plane over the course of the video. Based on the video metadata, such as the direction of capture, angle of capture, and time of capture, system 10 determines the focus plane of each video frame 36. Next, system 10 plots a panoramic path 40 according to user defined starting and finishing locations and time across the videos using the location and orientation of each video frame focus plane. The plotting of the path is preferably performed using the least square method and is performed across all possible video frames meeting the conditions specified by the user. The user may optionally be provided with possible paths for selection. Once a path is selected, whether by user input or automatically, a check 42 is performed to determine whether any gaps between adjacent frames are within a threshold. If so, the gaps are filled by predicting intermediate frames 44 using intra-frame prediction to bridge the gap. If accepted, system 10 will stitch the adjacent video frames to create a panoramic video 46. The best possible video frames (focus plane with least distance from the selected path) from different videos will thus be stitched together across the preferred path to create a panoramic video. If check 42 determines that the gaps exceed the threshold, a different patch is selected 48 and reevaluated at check 42 until the threshold is satisfied and the gaps are small enough to be filled 44 and a panoramic video 46 formed.

The descriptions of the various embodiments of the present invention have been presented for the purposes of illustration, but are not intended to be exhaustive or limited to the embodiments disclosed. Many modification and variations will be apparent to those of ordinary skill in the art without departing from the scope and spirit of the described embodiments. The terminology used herein was chosen to best explain the principles of the embodiments, the practical application or technical improvement over the technologies found in the market place, or to enable others of ordinary skill in the art to understand the embodiments disclosure herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   a processor;
   a computer readable storage medium having computer readable instructions thereon for causing the processor to execute a method for forming a panoramic video, the method comprising:
   searching video metadata for time, data and geolocation, to locate a plurality of videos captured from a same location at a same time period or an overlapping time period;
   extracting from the metadata of a plurality of videos, size and rotation invariant feature points of each frame of the plurality of videos;
   determining, based on the metadata extracted from the plurality of videos, a focus plane for each frame of the plurality of videos;
   selecting, at least two perspective points defining a path of focus frames upon which the panoramic video is formed from the plurality of videos;
   plotting, using a least square method, a curved line defining a possible panoramic video path across some or all of the plurality of videos over a user-selected period of time, using the focus plane of each of the plurality of videos and the at least two perspective points to join adjacent focus planes, wherein the least square method identifies the focus frames of the adjacent focus planes having the size and the rotation invariant feature points that are most closely related;
   predicting content missing from intermediate video frames between adjacent focus planes using a deep learning algorithm to create a heat map identifying most memorable and forgettable regions of the intermediate video frames and adjusting images of the intermediate video frames based on the heat map to fill gaps caused by the content missing from the intermediate video frames; and
   stitching together focus frames and intermediate video frames along the path of focus frames over the user-selected time period to form the panoramic video, wherein individual frames are aligned by first finding an incremental deformation of one frame relative to a three-dimensional coordinate system, and warping the incremental deformation by computing a difference error vector between pairs of frames.

2. The system of claim 1, wherein the step of searching comprises searching a social media website or public domain for the plurality of videos.

3. The system of claim 1, wherein the metadata comprises the direction of capture, the field of view, the angular orientation, and the zoom level.

4. The system of claim 3, wherein the computer system is a server programmed to stitch some or all of the plurality of videos together to form the panoramic video by stitching together a series of frames from adjacent videos.

5. The system of claim 1, further comprising:
   determining whether any discontinuity between the adjacent focus planes of the plurality of videos are within a threshold.

6. The system of claim 5, further comprising:
   selecting a different panoramic video path if the discontinuity between adjacent focus planes of the plurality of videos is above the threshold.

7. A method of forming panoramic video, comprising the steps of:
   searching video metadata for time, data and geolocation, to locate a plurality of videos captured from a same location at a same time period or an overlapping time period;
   extracting from the metadata of the plurality of videos, size and rotation invariant feature points of each frame of the plurality of videos;
   determining, based on the metadata extracted from the plurality of videos, a focus plane for each frame of the plurality of videos;
   selecting, at least two perspective points defining a path of focus frames upon which the panoramic video is formed from the plurality of videos;
   plotting using a least square method, a curved line defining a possible panoramic video path across some or all of the plurality of videos over a user-selected period of time, using the focus plane of each of the plurality of videos and the at least two perspective points to join adjacent focus planes, wherein the least square method identifies the focus frames of the adjacent focus planes having the size and the rotation invariant feature points that are most closely related;
   predicting content missing from intermediate video frames between adjacent focus planes using a deep learning algorithm to create a heat map identifying most memorable and forgettable regions of the intermediate video frames and adjusting images of the intermediate video frames based on the heat map to fill gaps caused by the content missing from the intermediate video frames; and stitching together focus frames and intermediate video frames along the path of focus frames over the user-selected time period to form the panoramic video, wherein individual frames are aligned by first finding an incremental deformation of one frame relative to a three-dimensional coordinate system, and warping the incremental deformation by computing a difference error vector between pairs of frames.

8. The method of claim 7, wherein the step of searching comprises searching a social media website or public domain for the plurality of videos.

9. The method of claim 7, wherein the step of extracting the metadata from the plurality of videos comprises determining the direction of capture, the field of view, the angular orientation, and the zoom level.

10. The method of claim 9, wherein the step of stitching some or all of the plurality of videos together to form panoramic video comprises stitching together a series of frames from adjacent videos.

11. The method of claim 10, wherein the step of stitching some or all of the plurality of videos together includes the step of determining whether any discontinuity between the adjacent focus planes of the plurality of videos are within a threshold.

12. The method of claim 11, wherein further comprising:
selecting a different panoramic video path if the discontinuity between adjacent focus planes of the plurality of videos is above the threshold.

13. A computer program product for forming panoramic video, the computer program product comprising a computer readable storage medium having program instructions embodied therewith, the program instructions executable by a computing device to cause the computing device to perform a method of forming panoramic video comprising:

searching video metadata for time, data and geolocation, to locate a plurality of videos captured from a same location at a same time period or an overlapping time period;

extracting from the metadata, size and rotation invariant feature points, the direction of capture, the field of view, the angular orientation, and the zoom level of each from of the plurality of videos;

determining, based on the metadata extracted from the plurality of videos, a focus plane for each frame of the plurality of videos;

selecting, at least two perspective points defining a path of focus frames upon which the panoramic video is formed from the plurality of videos;

plotting, using a least square method, a curved line defining a possible panoramic video path across some or all of the plurality of videos over a user-selected period of time, using the focus plane of each of the plurality of videos and the at least two perspective points to join adjacent focus planes, wherein the least square method identifies the focus frames of the adjacent focus planes having the size and the rotation invariant feature points that are most closely related;

predicting content missing from intermediate video frames between adjacent focus planes using a deep learning algorithm to create a heat map identifying most memorable and forgettable regions of the intermediate video frames and adjusting images of the intermediate video frames based on the heat map to fill gaps caused by the content missing from the intermediate video frames; and stitching together focus frames and intermediate video frames along the path of focus frames over the user-selected time period to form the panoramic video, wherein individual frames are aligned by first finding an incremental deformation of one frame relative to a three-dimensional coordinate system, and warping the incremental deformation by computing a difference error vector between pairs of frames.

14. The computer program product of claim 13, wherein the step of searching comprises searching a social media website or public domain for the plurality of videos.

15. The computer program product of claim 13, wherein the step of stitching some or all of the plurality of videos together to form the panoramic video comprises stitching together a series of frames from adjacent videos.

16. The computer program product of claim 15, wherein the step of stitching some or all of the plurality of videos together includes the step of determining whether any discontinuity between the adjacent focus planes of the plurality of videos are within a threshold.

17. The computer program product of claim 16, further comprises:
selecting a different panoramic video path if the discontinuity between adjacent focus planes of the plurality of videos is above the threshold.

* * * * *